United States Patent
Arpa et al.

(10) Patent No.: US 7,522,186 B2
(45) Date of Patent: Apr. 21, 2009

(54) METHOD AND APPARATUS FOR PROVIDING IMMERSIVE SURVEILLANCE

(75) Inventors: Aydin Arpa, Jacksonville, FL (US); Keith J. Hanna, Princeton Junction, NJ (US); Rakesh Kumar, Monmouth Junction, NJ (US); Supun Samarasekera, Princeton, NJ (US); Harpreet Singh Sawhney, West Windsor, NJ (US); Manoj Aggarwal, Lawrenceville, NJ (US); David Nister, Bellevue, WA (US); Stephen Hsu, Sunnyvale, CA (US)

(73) Assignee: L-3 Communications Corporation, New York, NY (US)

( * ) Notice: Subject to any disclaimer, the term of this patent is extended or adjusted under 35 U.S.C. 154(b) by 247 days.

(21) Appl. No.: 10/202,546

(22) Filed: Jul. 24, 2002

(65) Prior Publication Data
US 2003/0085992 A1 May 8, 2003

Related U.S. Application Data

(63) Continuation-in-part of application No. 09/800,550, filed on Mar. 7, 2001, now Pat. No. 6,985,620.

(60) Provisional application No. 60/339,726, filed on Nov. 2, 2001, provisional application No. 60/187,557, filed on Mar. 7, 2000.

(51) Int. Cl.
*H04N 7/18* (2006.01)
(52) U.S. Cl. .................. 348/153; 348/143; 348/152
(58) Field of Classification Search .......... 348/153, 348/152, 143; 725/131; 345/419, 582; 382/154
See application file for complete search history.

(56) References Cited

U.S. PATENT DOCUMENTS

| 5,164,979 A | 11/1992 | Choi et al. |
| 5,182,641 A | 1/1993 | Diner et al. |
| 5,276,785 A | 1/1994 | Mackinlay et al. |
| 5,289,275 A | 2/1994 | Ishii et al. ................... 348/154 |
| 5,495,576 A | 2/1996 | Ritchey |
| 5,696,892 A * | 12/1997 | Redmann et al. ............ 345/582 |

(Continued)

FOREIGN PATENT DOCUMENTS

EP 0898245 2/1999

(Continued)

OTHER PUBLICATIONS

Menet, et al., "B-snakes: implementation and application to stereo," Artificial Intelligence and Computer Vision, Elsevier Science, 1991, 223-236.
Yuille, et al., "Feature extraction from faces using deformable templates," Intl J. Computer Vision, 8(2):99-111, 1992.
Collins, et al., "The Ascender System: Automated site modeling from multiple aerial images," Computer Vision and Image Understanding, 72 (2), 143-162, Nov. 1998.

(Continued)

*Primary Examiner*—Allen Wong
(74) *Attorney, Agent, or Firm*—Tiajoloff and Kelly, LLP

(57) ABSTRACT

A method and apparatus for providing immersive surveillance wherein a remote security guard may monitor a scene using a variety of imagery sources that are rendered upon a model to provide a three-dimensional conceptual view of the scene. Using a view selector, the security guard may dynamically select a camera view to be displayed on his conceptual model, perform a walk through of the scene, identify moving objects and select the best view of those moving objects and so on.

40 Claims, 8 Drawing Sheets

U.S. PATENT DOCUMENTS

| | | | |
|---|---|---|---|
| 5,708,764 | A * | 1/1998 | Borrel et al. ............... 345/419 |
| 5,714,997 | A | 2/1998 | Anderson |
| 5,729,471 | A * | 3/1998 | Jain et al. ................... 725/131 |
| 5,847,755 | A | 12/1998 | Wixson et al. |
| 5,850,352 | A | 12/1998 | Moezzi et al. |
| 5,850,469 | A | 12/1998 | Martin et al. |
| 5,963,664 | A | 10/1999 | Kumar et al. |
| 6,009,190 | A * | 12/1999 | Szeliski et al. ............. 382/154 |
| 6,018,349 | A | 1/2000 | Szelinski et al. |
| 6,108,437 | A | 8/2000 | Lin |
| 6,144,375 | A | 11/2000 | Jain et al. |
| 6,144,797 | A | 11/2000 | MacCormack et al. |
| 6,166,763 | A | 12/2000 | Rhodes et al. |
| 6,424,370 | B1 | 7/2002 | Courtney |
| 6,512,857 | B1 | 1/2003 | Hsu et al. ................... 382/294 |
| 6,522,787 | B1 | 2/2003 | Kumar et al. |
| 6,668,082 | B1 | 12/2003 | Davidson et al. |
| 6,985,620 | B2 | 1/2006 | Sawhney et al. |
| 6,989,745 | B1 | 1/2006 | Milinusic et al. |
| 7,124,427 | B1 | 10/2006 | Ebensen |
| 2001/0043738 | A1 | 11/2001 | Sawhney et al. ............ 382/154 |
| 2002/0089973 | A1 | 7/2002 | Manor |
| 2002/0094135 | A1 | 7/2002 | Caspi et al. |
| 2002/0097798 | A1 | 7/2002 | Manor |
| 2002/0140698 | A1 | 10/2002 | Robertson et al. |
| 2003/0014224 | A1 | 1/2003 | Guo et al. |
| 2003/0085992 | A1 | 5/2003 | Arpa et al. |
| 2004/0071367 | A1 | 4/2004 | Irani et al. |
| 2004/0239763 | A1 | 12/2004 | Notea et al. |
| 2004/0240562 | A1 | 12/2004 | Bargeron et al. |
| 2005/0024206 | A1 | 2/2005 | Samarasekera et al. |
| 2005/0057687 | A1 | 3/2005 | Irani et al. |

FOREIGN PATENT DOCUMENTS

| | | |
|---|---|---|
| JP | 6-28132 | 2/1994 |
| JP | 9-179984 | 7/1997 |
| JP | 10-188183 | 7/1998 |
| JP | 10-210546 | 8/1998 |
| JP | 2001-118156 | 4/2001 |
| WO | WO 96/22588 | 7/1996 |
| WO | WO 97/37494 | 10/1997 |
| WO | WO 00/16243 | 3/2000 |
| WO | WO 00/72573 | 11/2000 |
| WO | WO 01/67749 A2 | 9/2001 |
| WO | WO 02/15454 A2 | 2/2002 |
| WO | WO 03/003720 | 1/2003 |
| WO | WO 03/067537 | 8/2003 |
| WO | WO 2004/114648 A2 | 12/2004 |
| WO | WO2006/017219 A2 | 2/2006 |

OTHER PUBLICATIONS

Huertas, et al., "Use of IFSAR with Intensity Images for Automatic Building Modeling," IUW 1998.
Jolly, et al., "Vehicle Segmentation and Classification Using Deformable Templates," IEEE Transactions on Pattern Analysis and Machine Intelligence, vol. 18, Mar. 1996, 293-308.
Noronha, et al., "Detection and Description of Buildings from Multiple Aerial Images," DARPA IUW, 1997.
Pope, et al., "Vista: A software environment for computer vision research," CVPR 1994, Seattle, 768-772.
Sawhney, et al., "Multi-view 3D Estimation and Applications to Match Move," Proc. Of the IEEE Workshop on Multi-view Modeling & Analysis of Visual Scenes, Fort Collins, CO, USA, Jun. 1999.
Shufelt, "Performance Evaluation and analysis of monocular building extraction from aerial imagery," IEEE Trans. PAMI, 21(4), Apr. 1999, 311-325.
Tao, et al., "Global Matching Criterion and Color Segmentation Based Stereo," Proc. Workshop on the Application of Computer Vision (WAVC2000), Dec. 2000.
Weng, et al., "Learning based ventricle detection from cardiac MR and CT images," IEEE Trans. Med. 1997.
J. Weng, "On comprehensive visual learning," invited paper in Proc. NSF/ARPA Workshop on Performance vs. Methodology in Computer Vision, Seattle, WA, Jun. 24-25, 1994, 152-166.
International Search Report dated Jul. 28, 2003 for corresponding PCT application, PCT/US02/34913.
U.S. Appl. No. 60/479,950, filed Jun. 19, 2003, Samarasekera et al.
Vedula et al., Modeling, Combining, and Rendering Dynamic Real-World Events from Image Sequences, 1998(?).
Silicon Graphics, Silicon Graphics Witches Brew UAV, UAV, Nov. 10, 1998.
Dorsey et al., Design and Simulation of Opera Lighting and Projection Effects, Jul. 1991, Computer Graphics, vol. 25, No. 4, pp. 41-50.
State et al., Technologies for Augmented Reality Systems: Realizing Ultrasound-guided Needle Biopsies, 1996(?).
Spann et al., Photogrammetry Using 3D Graphics and Projective Textures, 2000, IAPRS, vol. XXXIII, Amsterdam.
Sequeira et al., Augmented Reality in Multi-camera Surveillance, May 1999, ESCARDA Symposium on Safeguards and Nuclear Material Management, pp. 661-666, Seville, Spain.
Segal et al., Fast Shadows and Lighting Effects Using Texture Mapping, Jul. 1992, Computer Graphics, vol. 26, No. 2, pp. 249-252.
Akesson (?), Augmented Virtuality: A method to automatically augment virtual worlds with video images, Apr. 20, 1998.
Bajura et al., Merging Virtual Objects with Real World, Jul. 1992, Computer Graphics, vol. 26, No. 2, pp. 203-210.
Weinhaus et al., Texture Mapping 3D Models of Real-World Scenes, Dec. 1997, ACM Computing Surveys, vol. 29, No. 4, pp. 325-365.
Simsarian et al., Windows on the World: An example of Augmented Virtuality, 1997(?).
Kawasaki et al., Automatic Modeling of a 3D City Map from Real-World Video, Oct. 1999, ACM Multimedia '99, pp. 11-18.
Akesson et al., Reality Portals, pp. 11-18, ACM,1999.
Debevec et al., Modeling and rendering architecture from photographs: a hybrid geometry and image-based approach, 1996(?), pp. 1-10.
Kumar et al., 3D Manipulation of Motion Imagery, http://dblp.uni-trier.de, 2000.
Hsu et al., Pose Estimation, Model Refinement, and Enhanced Visualization Using Video, 2000 Conf. on Comp. Vision and Pattern Recog., IEEE Comp.Soc., Jun. 13-15, 2000, SC, USA.
Espacenet English Language Abstract for JP6-28132, Feb. 4, 1994.
Espacenet English Language Abstract for JP 9179984, Jul. 11, 1997.
Espacenet English Language Abstract for JP2001-118156, Apr. 27, 2001.
Espacenet English Language Abstract for JP 10-188183, Jul. 21, 1998.
Patent Abstracts of Japan English language abstract for JP6-28132, Feb. 4, 1994.
Patent Abstracts of Japan English language abstract for JP9179984, Jul. 11, 1997.
Patent Abstracts of Japan English language abstract for JP2001-118156, Apr. 27, 2001.
Rakesh Kumar, Harpreet Sawhney, Supun Samarasekera, Steve Hsu, Hai Tao, Yanlin Guo, Keith Hanna, Arthur Pope, Richard Wildes, David Hirvonen, Michael Hansen, and Peter Burt,"Arial Video Surveillance and Exploitation," Proceedings of the IEEE, vol. 89, No. 10, Oct. 2001.
Luc Van Gool, Andrew Zisserman, "Automatic 3D Model Building from Video Sequences," Wiley & Sons, Chichester, GB, vol. 8, No. 4, Jul. 1997, pp. 369-378.
Richard Szeliski, "Image Mosaicing for Tele-Reality Applications," Proceedings of the Second IEEE Workshop on Applications of Computer Vision, IEEE Compu. Soc. Press, Los Alamitos, CA, 1994, pp. 44-53.
Patent Abstracts of Japan, English language abstract for JP 10-210456, Published Aug. 7, 1998.

* cited by examiner

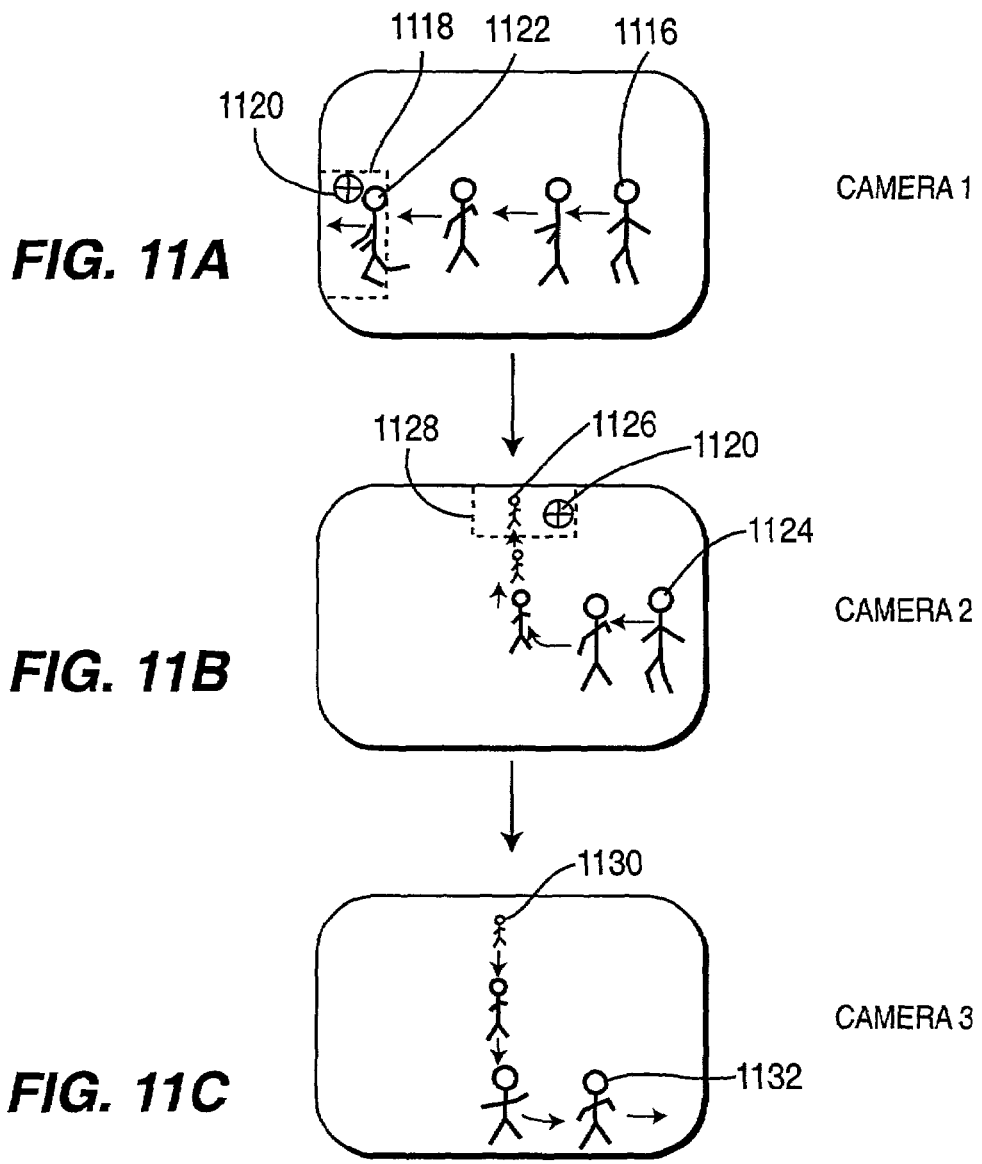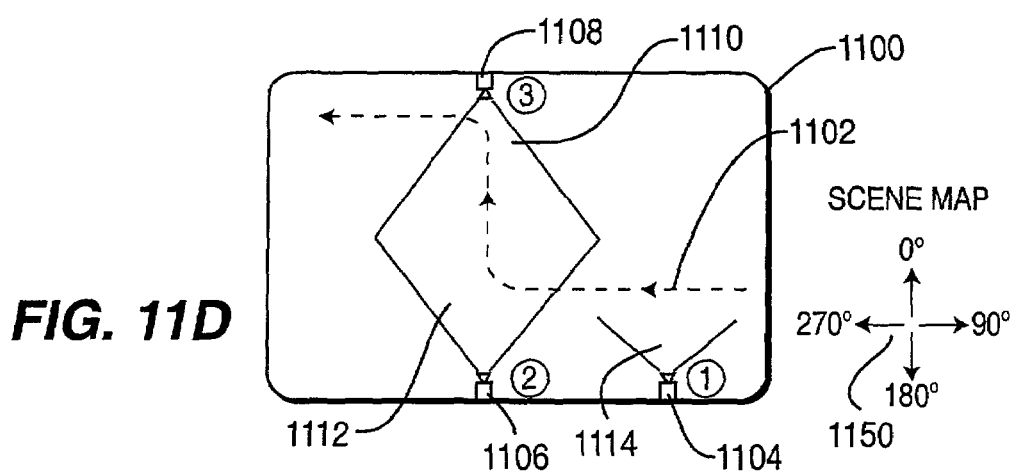

METHOD AND APPARATUS FOR PROVIDING IMMERSIVE SURVEILLANCE

CROSS-REFERENCE TO RELATED APPLICATIONS

This application claims benefit of U.S. provisional patent application Ser. No. 60/339,726, filed Nov. 2, 2001 which is herein incorporated by reference.

This application is a continuation-in-part of U.S. patent application Ser. No. 09/800,550 filed Mar. 7, 2001 by inventors Harpreet Singh Sawhney, Rakesh Kumar, Steve Hsu, and Supun Samarasekera, now issued as U.S. Pat. No. 6,985,620 B2, and claims benefit of United States provisional patent application 60/187,557 filed Mar. 7, 2000, by inventors Harpreet Singh Sawhney, Rakesh Kumar, Steve Hsu, and Supun Samarasekera.

GOVERNMENT RIGHTS IN THIS INVENTION

This invention was made with U.S. government support under contract number F30602-00-C-0143. The U.S. government has certain rights in this invention.

BACKGROUND OF THE INVENTION

1. Field of the Invention

The present invention generally relates to surveillance systems and, more particularly, relates to a method and apparatus for providing immersive surveillance.

2. Description of the Related Art

The objective of a surveillance or visualization display is typically to allow a user to monitor or observe a scene with full awareness of the situation within the scene. Typical surveillance or visualization systems present video to a user from more than one camera on a single display. Such a display allows the user to observe different parts of the scene, or to observe the same part of the scene from different viewpoints. A typical surveillance display, for example, has 16 videos of a scene shown in a 4 by 4 grid on a monitor. Each video is usually labeled by a fixed textual annotation displayed under the video segment to identify the image. For example, the text "lobby" or "front entrance" may be shown. If an event deserving attention is observed in one particular video, then the label can be used to locate the activity in the scene.

This approach for surveillance and visualization has been used widely for many years. However, there are some fundamental problems with this approach.

First, if an event deserving attention occurs in one particular video, then the user does not know how the activity relates to other locations in the scene without referring to or remembering a map or 3D model of the scene. For example, if activity is observed near "elevator 1" and the user knows that a guard is currently at "stairwell 5", then without a map or 3D model, the user will not know if the guard is very close or very far from the activity in order to intervene. The process of referring to a map or 3D model either on paper or on a computer is typically time-consuming and error-prone since a human is involved in the association of the camera view to the map or model. The process of remembering a map or 3D model is also error-prone, and typically impossible when large numbers of cameras are used or if the site is large.

Second, if an event deserving attention occurs in a video and then the activity moves out of the field of view of the video in one particular direction, then there are only two ways that the user can predict the new location of the activity. First, the user can remember the orientation (pointing direction) of the camera with respect to a fixed coordinate system (for example, the compass directions). Second, the user can recognize landmarks in the video and can use the landmarks to determine the approximate orientation of the camera with respect to a fixed coordinate system by remembering or referring to a map or 3D model of the scene. These two methods of predicting the new location of activity are error-prone, since typically the views from cameras are shown with respect to many different arbitrary coordinate systems that vary widely from camera to camera depending on how each camera was mounted during installation. As more cameras are added to the system, the more difficult it is for the user to remember their orientations or to recognize the landmarks in the scene. In addition, some parts of the scenes may contain no distinguishing landmarks at all.

Third, as more videos are displayed on a screen, then the resolution of each video has to be reduced in order to fit them into a display. This makes it difficult to observe the details of any event deserving attention in the video. The current solution to this problem is either to have an additional display that shows one selected video at high resolution, or to switch a single display between the view showing multiple reduced resolution videos and a view showing a single video at high resolution. However, the problem with this approach is that the user will miss any activity that may be occurring in other videos while they are focusing on the single high-resolution video.

Therefore, there is a need in the art for a method and apparatus for providing an immersive surveillance system that provides a user with a three-dimensional contextual view of a scene.

SUMMARY OF THE INVENTION

The present invention is a method and apparatus for providing immersive surveillance wherein a remote user may monitor a scene using a variety of imagery sources that are rendered upon a three-dimensional model to provide a three-dimensional contextual view of the scene. The surveillance system comprises a plurality of cameras supplying video and an image processor for applying the videos to a three dimensional (3D) model of the scene. The rendered model/video combination provides a 3D contextual view of the scene in which the user can be immersed. Using a view selector, the user may dynamically select a specific view to be displayed from the contextual model, perform a virtual walk through of the scene, identify moving objects and select the best view of those moving objects, and so on.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIGS. 11A, 11B, 11C and 11D depicts an example of the operation of the embodiment of FIG. 9.

DETAILED DESCRIPTION OF THE PREFERRED EMBODIMENT

Figure 1:
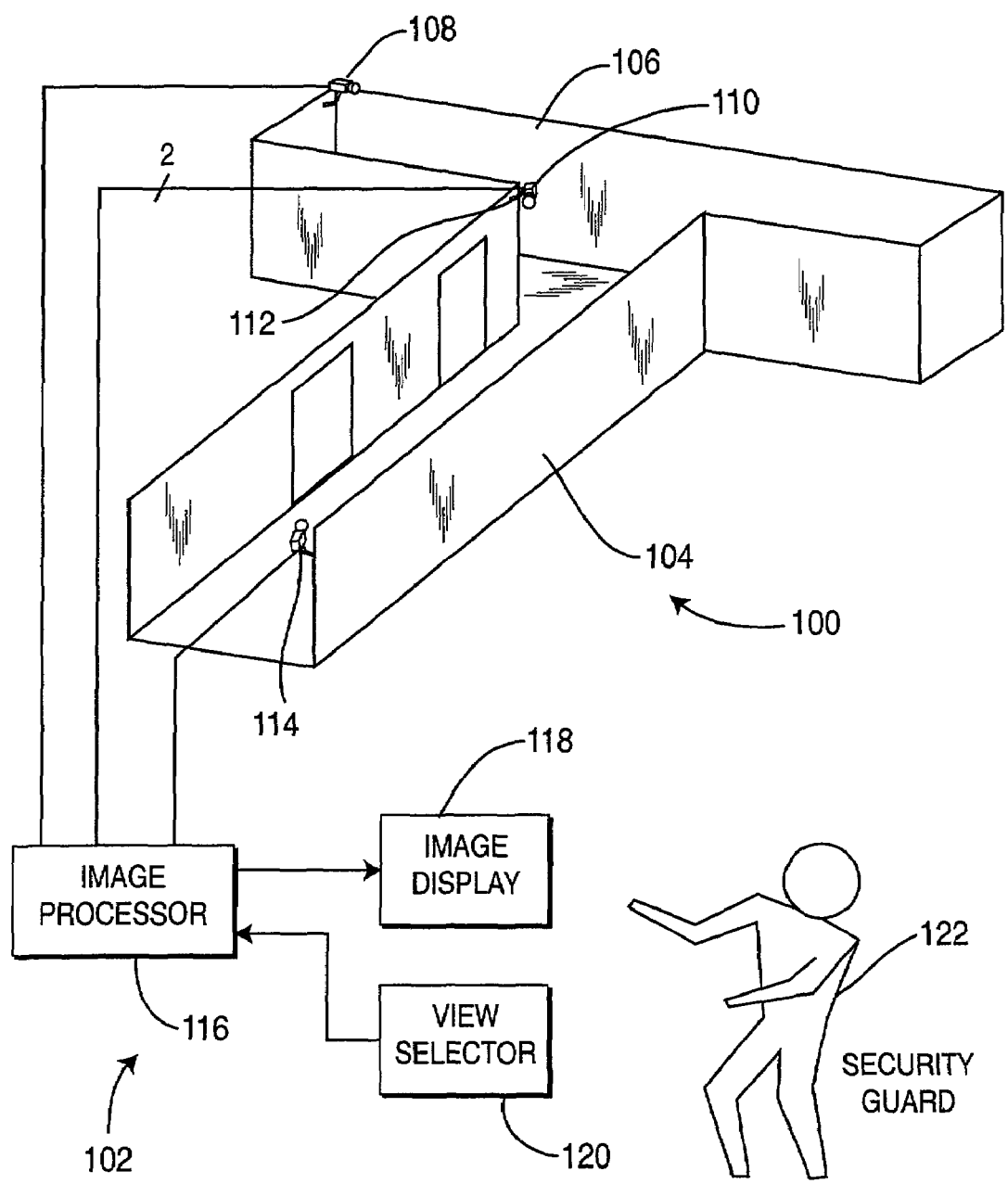
FIG. 1 depicts a high level block diagram of the present invention.

FIG. 1 depicts a block diagram of a surveillance system 102 as applied to monitor activity in a simple hallway scene 100. The hallway scene 100 comprises a first hallway 104 and a second hallway 106 that intersect and form a "T" shape. The hallway structure 100 is monitored by four cameras 108, 110, 112 and 114. These cameras are coupled to an image processor 116. The image processor processes the imagery from the cameras 108, 110, 112 and 114 to produce an image for display on an image display 118 (e.g., a video monitor). The particular view rendered from the various cameras is selectable using view selector 120. Generally, a user, e.g., a security guard 122, may be located either at the facility containing the scene 100 or may be remotely located from the scene 100. As shall be described below, the scene is modeled as a three-dimensional computer model and the imagery from the cameras 108, 110, 112, 114 is overlaid upon the model to provide a three-dimensional contextual view of the hallway scene 100 to the security guard 122. The security guard, by manipulating the view selector, can take a virtual tour of the scene, can identify and isolate moving objects within the scene, can view the scene from either the camera locations or from locations between the cameras from a virtual viewpoint, can view the scene from a "bird's eye" view to identify moving objects or other locations to be viewed within the scene.

Figure 6:
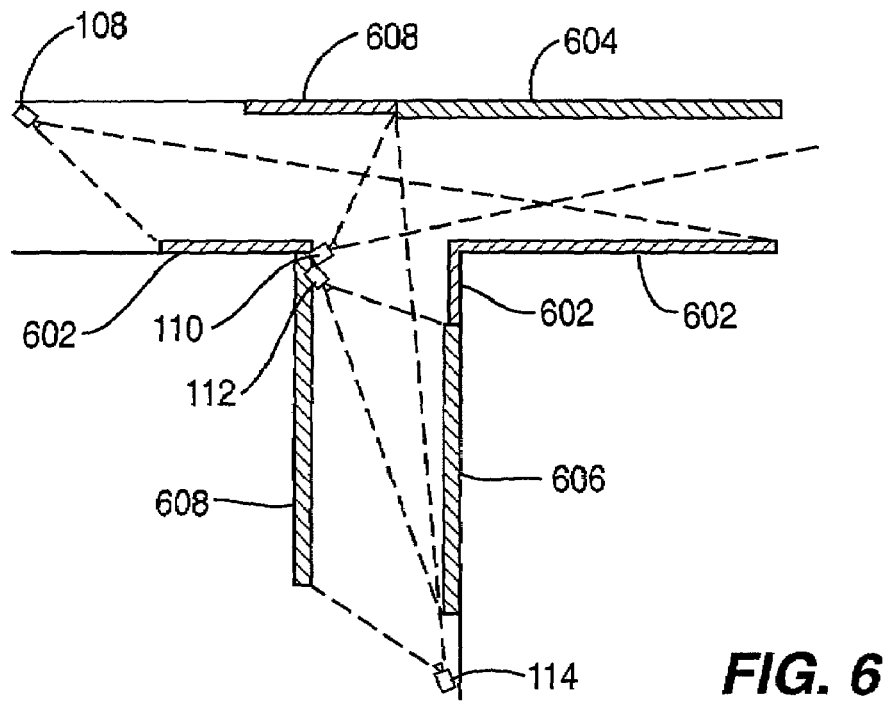
FIG. 6 depicts a "birds eye" view of an illustrative hallway structure within a scene that can be monitored with the present invention.

FIG. 6 depicts a "bird's eye" view of the scene 100 of FIG. 1. The cameras are place such that the scene, and especially the hallway junction, is covered by multiple views of the cameras. Each camera 108, 110, 112 and 114 has a particular viewing area respectively 602, 604, 606 and 608. As shall be discussed below, the three-dimensional model of the structure 100 will be "draped" with the imagery collected from each of the cameras 108, 110, 112 and 114 such that the security guard will view a contextual model of the scene that immerses the security guard in the surveillance situation. The cameras 108, 110, 112, 114 are generally located to cover as much of the scene as possible and slightly overlap between the camera views to enable the model to align the various images with one another. However, the surveillance system of the present invention uses the model of the scene as the coordinate system for aligning all of the imagery of the scene such that overlapping of the camera views is not necessary.

Figure 2:
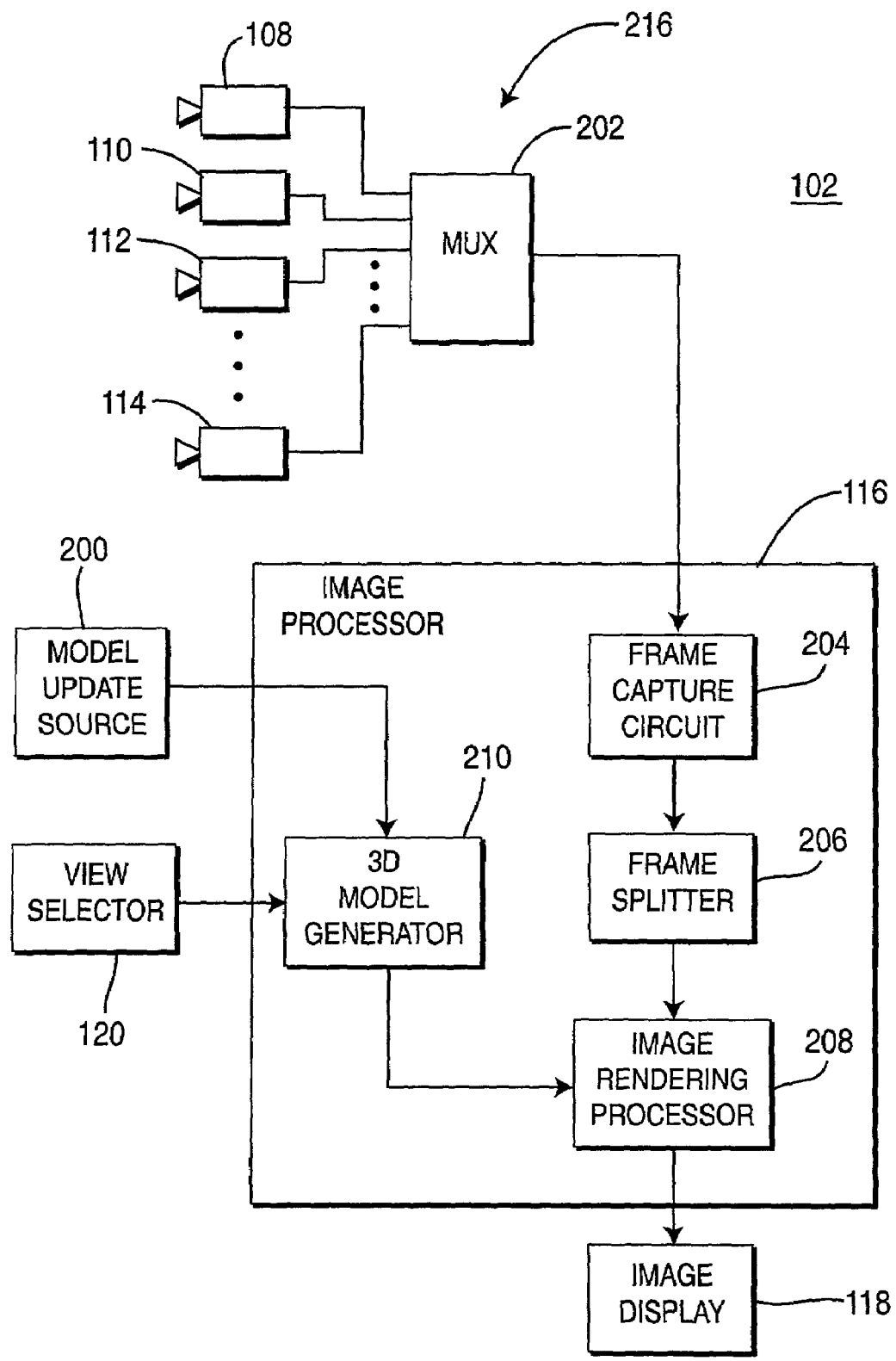
FIG. 2 depicts a detailed block diagram of the surveillance system in accordance with the present invention.

FIG. 2 depicts a block diagram of the surveillance system 102 of the present invention. System 102 comprises a camera assembly 212, an image processor 116, a model update source 200, a view selector 120 and an image display 118. The camera assembly comprises a plurality of cameras 108, 110, 112 and 114 coupled to a multiplexer 202. Any number of cameras may be used and coupled to a plurality of multiplexers such that the camera assembly 212 may cover entire buildings or regions that are to be surveilled. The multiplexer 202 combines the video streams from the, for example, four cameras by splitting the screen into four quadrants and inserting one stream in each quadrant. The stream of video frames is coupled to the image processor 116. The image processor 116 comprises a frame capture circuit 204, a frame splitter 206, an image rendering processor 208 and a 3D model generator 210. One example of a computer system that can be used as the image processor in accordance with the invention is a dual processor, dual PCI bus, general purpose computer comprising two Pentium 4 processors, an INVIDIA GeForce3 GPU-based video card and four frame capture circuits.

The frame capture circuit 204 captures, in a known manner, each frame of video and temporarily stores that information in a memory. The frame splitter 206 is used to demux the video streams so that the video signal from each camera will be processed and stored independently. The 3D model generator 210 and the image rendering processor 208 work together to generate the contextual view of the scene. The 3D model of scene 100 is apriori generated as a wire frame or planar computer model. The model update source 200 provides the 3D model. The view of the model that is to be rendered is identified by the view selector 120. Typically, the view selector comprises a joy stick, a mouse pointer, and a zoom control such that the security guard may move about the scene as well as zoom in or out on particular objects within the scene and select various views of the scene, as needed. Once the view of the model is generated, the model is coupled to the image rendering processor where the various video images from the cameras are warped into alignment with the model and rendered upon or draped upon the model. The particular view of the model containing the view is displayed.

The coordinate system of the model is used for aligning the video imagery. The video images are closely aligned to the common coordinate system so that the user is easily able to determine how activity in one video relates to activity in other videos without referring to or remembering a map or 3D model of the scene. For instance, if an event deserving attention occurs in a video from one camera view and the activity then moves out of the field of view of that camera in a particular direction, the user can easily predict the new location of the activity within the view of another camera. The user is able to do this without having to remember the orientation of the camera since all video from the cameras is now aligned. For example, if activity moves out of one camera view to the right, then the user can expect to see the activity being recaptured from cameras with views that are displayed to the right of the first view. By using a common coordinate system from the 3D model, multiple, non overlapping portions of the video imagery from the cameras can be aligned to the model. One particular process for rendering imagery to a 3D model that can be used by the surveillance system of the present invention is described in U.S. patent application Ser. No. 09/800,550, filed Mar. 7, 2001 and incorporated herein by reference. Other processes for rendering images to a 3D model can be used.

Figure 3:
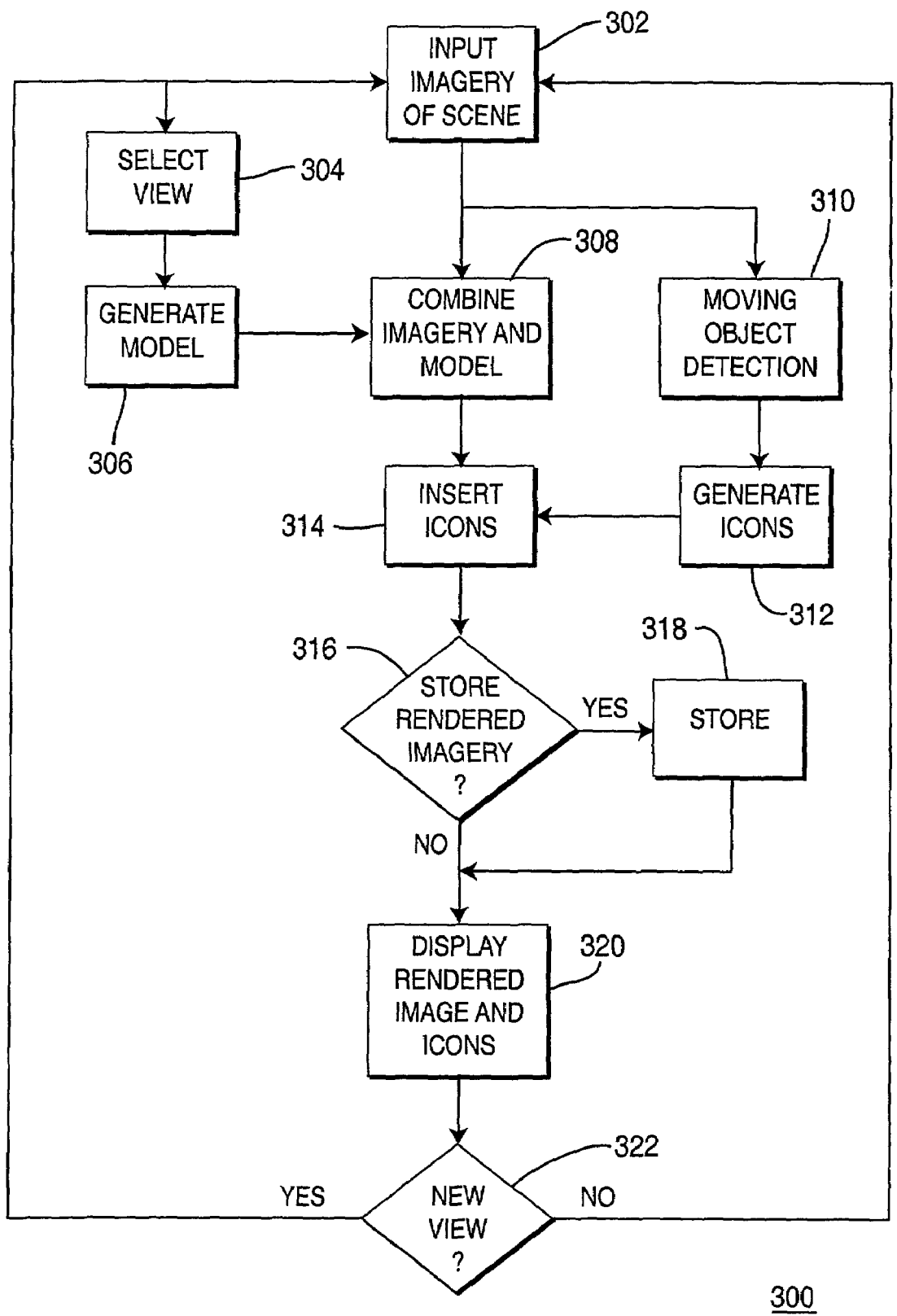
FIG. 3 depicts a flow chart of the operation of the present invention.

FIG. 3 depicts a flow diagram 300 of a process 300 by which the surveillance system 102 of the present invention operates. At step 302, input imagery from the cameras is coupled to the image processor. At step 304, the user selects a view of the scene and that view information is coupled to step 306 where the model is generated that depicts the model as viewed from the location selected in the view selection step 304. The overall model of the scene is apriori rendered using various well-known modeling techniques. The model generation step 306 is used to produce the model from the selected viewpoint. To produce a model, an outline of the location or building is encoded in a 3D digital format. The outline model comprises the perimeter of the location or building and also the outline of key areas such as corridors, streets, buildings, and so on. The outline model may also contain simple attributes of the location such as room numbers. The source for the outline model can be from simple measurements recorded manually, followed by encoding into one of the 3D formats known in the art such as Alias/Wavefront OBJ, Open Inventor, VRML and the like.

A technician marks the location of each camera on the outline model of the scene. The technician performs this process using information from the surrounding regions such as a room number, building shape or other distinguishing landmarks and by corresponding the camera locations manually to the outline model. The technician also defines the camera parameters such as height and orientation. The camera orientation comprise the pan, tilt and roll of the cameras with respect to a global coordinate system defined by the scene. There are many methods known in the art for measuring the pan, tilt and roll of a camera, any of which are useful in building the model of the scene. The result of the process for defining the camera parameters is a set of parameters that define location, height, pan, tilt and roll for each camera with respect to a global outline model of the scene.

Subsequently, the planar surfaces of the outline model of the scene are then modeled using well known 3D shape modeling techniques. For example, one method for recovering polygons within a scene is for the installation technician to perform simple model building using captured imagery and knowledge of the 3D shape of the scene. The technician loads a single image from each camera view into a display. The technician then selects a set of points in the image that define the boundaries of a single planar surface in the scene, such as a wall. The surface need not be entirely planar, objects that are attached to the surface such as heaters may be defined as belonging to a single plane. The technician then records whether the plane is approximately vertical or horizontal, or any other predetermined orientation. The technician then repeats the process for other planar surfaces in the scene and for each camera view. In addition, the technician records the floor upon which each camera is located in a multi-floor building. The result of the process is a set of points in the coordinate system of the images, a set of flags defining the orientation of the surfaces in 3D and a set of numbers defining the floor upon which each camera is located.

Other modeling techniques may be used to develop a full 3D model of the scene. Additionally texture may be mapped onto the 3D model such that the walls and floors and other objects within the scene that are not draped with video during the rendering process have apparent texture to the user.

At step 308, the model from the selected viewpoint and the input imagery are combined to render a view of the scene as directed by the security guard. In the example described herein, it is assumed that the camera locations are static, but from the following description it will be clear that the cameras may pan and tilt dynamically and the imagery updated dynamically to reflect the pan and tilt motion. The rendered view of the scene does not, at this point, contain moving objects. The rendering process is performed as described in U.S. patent application Ser. No. 09/800,550, filed Mar. 7, 2001 or a similar rendering process. In summary, the video from each camera is aligned to the model and warped into position. The warped video from each camera is applied to the model and merged to form the contextual view of the scene. In this manner, the hallway structure of scene 100 will contain walls represented with video imagery from the cameras. The user is presented with a "real" 3D view of the scene 100.

Moving objects within the scene are processed at step 310. Where the input imagery is processed to identify moving objects and then produce icons that are inserted into the rendered view such that the security guard may identify movement within the scene. The process for identifying movement is described with respect to FIG. 4 and the process for generating icons to represent the motion is described with respect to FIG. 5 below. At step 314, the icons are inserted into the rendered imagery. At step 316, the process 300 queries whether the rendered imagery should be stored. If the query at step 316 is answered affirmatively, the imagery is stored either on video tape or in digital memory at step 318. Such storage allows the model and its constituent video to be "rewound" and "replayed" by the security guard, if desired. At step 320, a rendered image and icons are displayed for the security guard. At step 322, the process 300 queries whether a new view is selected by the security guard. If a new view is not selected, the process returns to step 302 and processes more of the video streams from the cameras. If a new view has been selected, then the process returns to both steps 302 and 304 to generate a new model of the new view as well as apply the new imagery to the new view of the model.

If the cameras used to produce the video have pan/tilt/zoom (PTZ) features, this camera motion must be accommodated when rendering views of a scene. If the PTZ orientation of a camera is captured by encoders on the camera, the system can read this information directly from the camera. Then, the system accesses a look-up table to find the pose of the camera within the geometry of the scene given the PTZ values. The pose is used to render a display.

To create the pose look-up table, a calibration process must be performed. The camera is pointed at a particular location in the scene and a user identifies (typically by pointing and clicking a mouse pointer) points in the image and corresponding points in the 3D model. The system then computes the rotation portion of the pose for that particular set of PTZ values. This procedure is repeated for several images having the camera pointed in various directions. The captured PTZ values and the computed pose for each direction are stored in the pose look-up table. An interpolation algorithm then computes PTZ and pose values between the measured values to fully populate the pose look-up table.

If the foregoing encoder-based approach is not accurate enough to enable alignment of the video and the model, or encoders are not available to produce camera PTZ values, then image information can be used to match against the model and achieve alignment without PTZ values or with inaccurate PTZ values.

One procedure aligns the video directly with the 3D model. This procedure is described in U.S. patent application Ser. No. 09/800,550, filed Mar. 7, 2001 This alignment procedure can be augmented with the teachings of U.S. patent application Ser. No. 09/075,462, filed May 8, 1998 to utilize texture maps and image filtering to improve image alignment when scene illumination varies.

A second technique aligns the video to a spherical image mosaic that itself has been aligned (possibly manually) to the 3D model. This is a robust technique because image-to-image alignment is performed rather than image-to-model alignment. Spherical image mosaics are a priori produced in a conventional manner for each camera having PTZ features. These mosaics are aligned to the 3D model and stored. Subsequent images from the cameras are aligned to the mosaics to provide accurate alignment of current images to the 3D model. To ensure alignment errors will not occur during changes in scene illumination, either multiple mosaics for each camera can be produced at various light levels or techniques disclosed in U.S. patent application Ser. No. 09/075,462, filed May 8, 1998, incorporated herein by reference, can be used to align images over broad variations in illumination.

Figure 4:
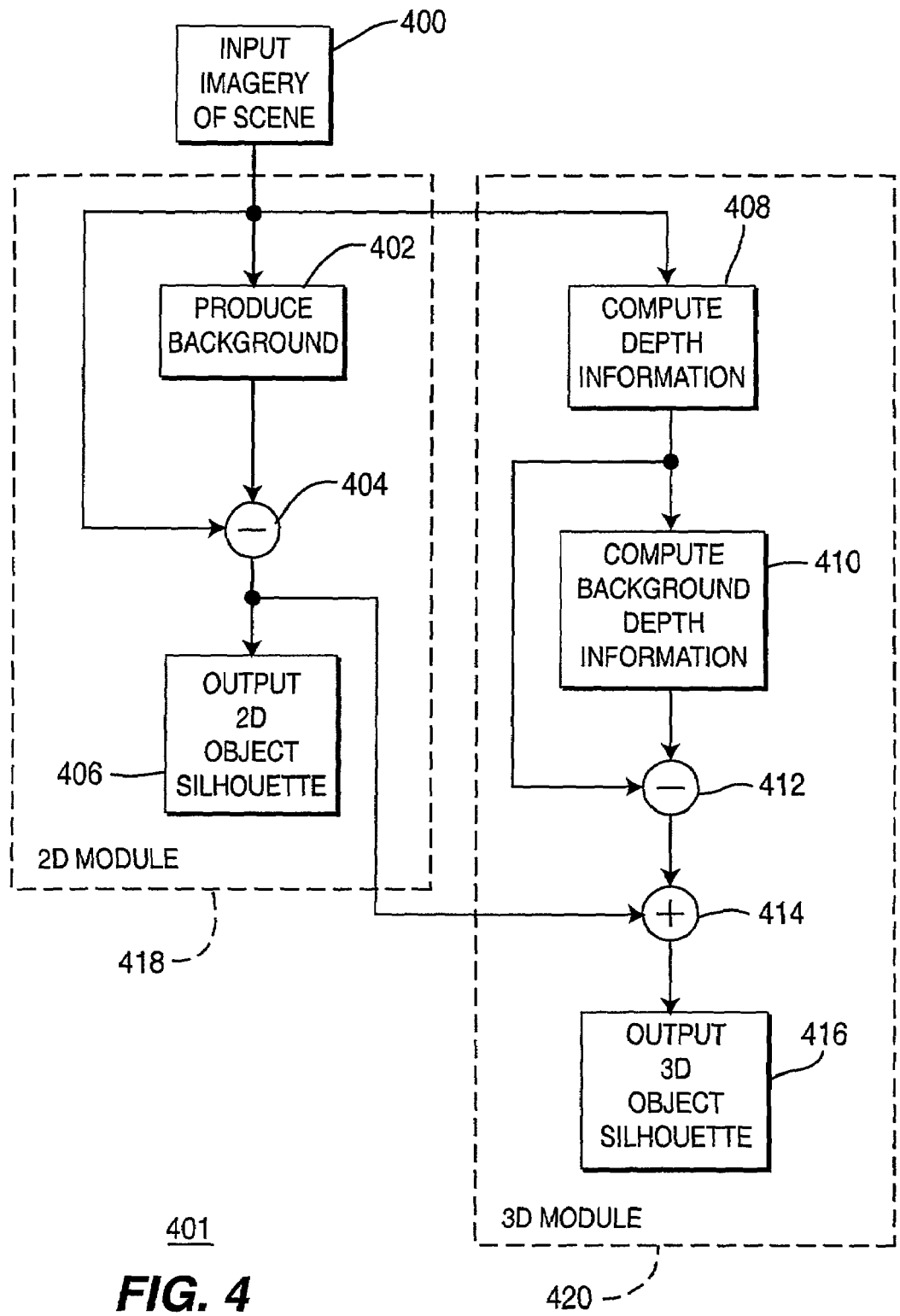
FIG. 4 depicts a process for identifying moving objects in accordance with the present invention.

FIG. 4 depicts a process 401 (performed at step 310 of FIG. 3) for identifying moving objects within the scene. At step 400, the image sequence is input to the process. The image sequence is processed by both a two-dimensional (2D) module 418 and a three-dimensional (3D) module 420. The 2D module 418 separates foreground objects from the static background scene. The 3D module 420 performs depth and shape recovery to enable the process 401 to identify the form of object that is moving in the scene. At step 402, the static background information (a reference image) within the scene is extracted from the image sequence using a well known filtering technique that remove foreground motion from a video sequence. One such method is disclosed in European Patent Publication Number EP 1045591. The reference image is then subtracted from the original image sequence at step 404 to produce a two dimensional (2D) object silhouette for each moving object in the scene. All moving objects will be appear as a silhouette in step 406.

To accurately identify objects moving in a 3D scene, three dimensional information is necessary to identify and isolate moving objects versus objects that apparently move because of camera movement, shadows, and the like. Such three dimensional processing is performed in the 3D module comprising steps 408, 410, 412 and 414. At step 408, depth information is computed from the image sequence. At step 410, background depth information is computed or determined and, at step 412, the background depth information is subtracted from the depth information gleaned from the image sequence to produce foreground object depth information only. The foreground depth information is combined with the object silhouette information at step 414 to produce three dimensional object silhouettes at step 416. By combining the 2D and 3D object silhouette information, foreground objects that apparently moved due to camera movement or shadows are now identifiable as non-moving objects. As such, the object silhouettes produced at step 416 accurately depict the foreground objects that are moving within a scene.

Once the foreground objects have been segmented and their depth and shapes have been recovered, then it is possible to model these objects in three dimensions. If each object silhouette is rendered into a three dimensional model then when the model is inserted as an icon into the rendered imagery of the scene that foreground object can be visualized from different viewpoints and appear geometrically correct within the scene.

Figure 5:
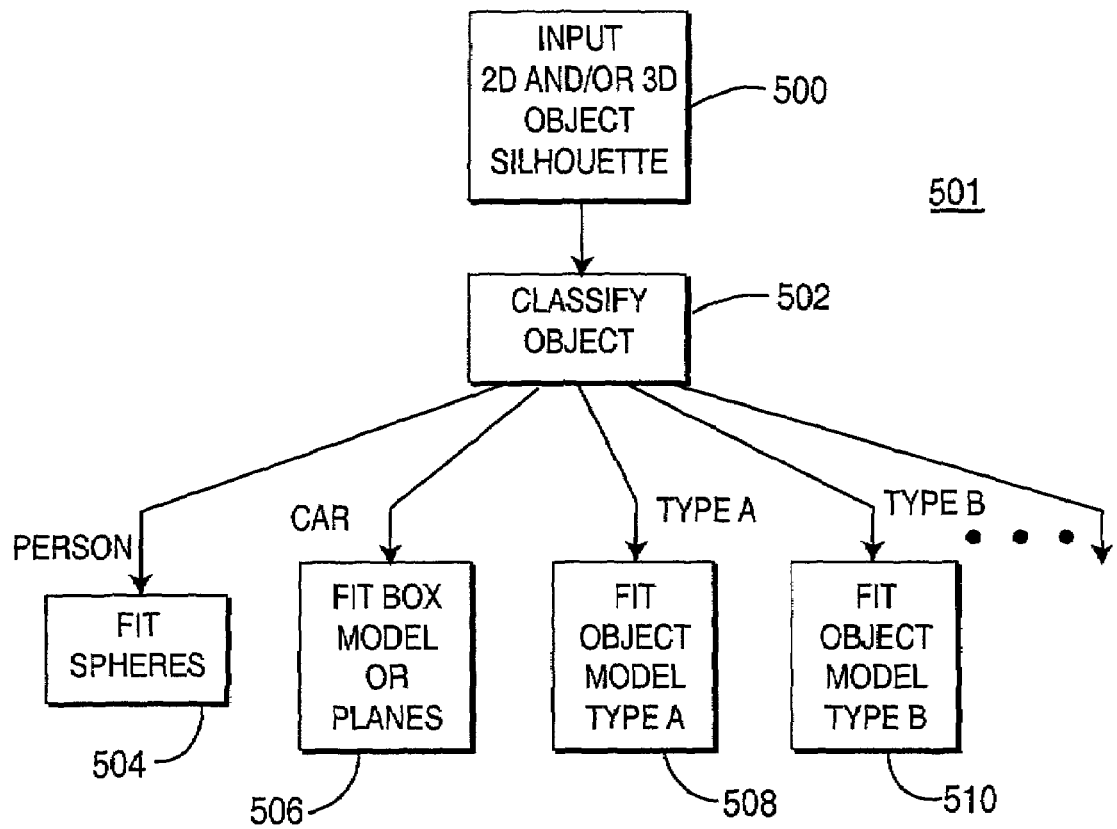
FIG. 5 depicts a process for assigning icons to moving objects in accordance with the present invention.

FIG. 5 depicts a flow diagram of a process 501 (performed at step 312 of FIG. 3) for generating icons that are three dimensional models of moving objects within a scene. At step 500, the 2D and/or 3D object silhouettes from process 401 of FIG. 4 are input into the process 501. The object silhouettes generally comprise both depth and/or shape information from the depth estimation module as well as textural information such as color and brightness. For example, significant textural discontinuities that are also close to the significant depth discontinuities can be classified to be part of the outline or silhouette of the object. At step 502, the object silhouette is classified. The purpose of this classification step is to identify the model type that should be fit to the foreground object. Classification can be performed by analyzing attributes of the object. Examples of attributes include size and shape of the silhouette. An example of a method that can recover the attributes of an object is a moment analysis. The first and second order moments computed on the foreground object can be used to determine whether or not an object is slender. A slender object may be classified as a human, and non-slender object may be classified as another type of object such as a vehicle. Depending on the classification, different models for the object can be invoked. For example, at step 504, a human may be modeled by a set of spheres and, at step 506, a vehicle can be modeled as a box. Other object would be modeled as various types in steps 508 and 510. These icons (object models) are inserted into the rendered imagery as described above.

Figure 7:
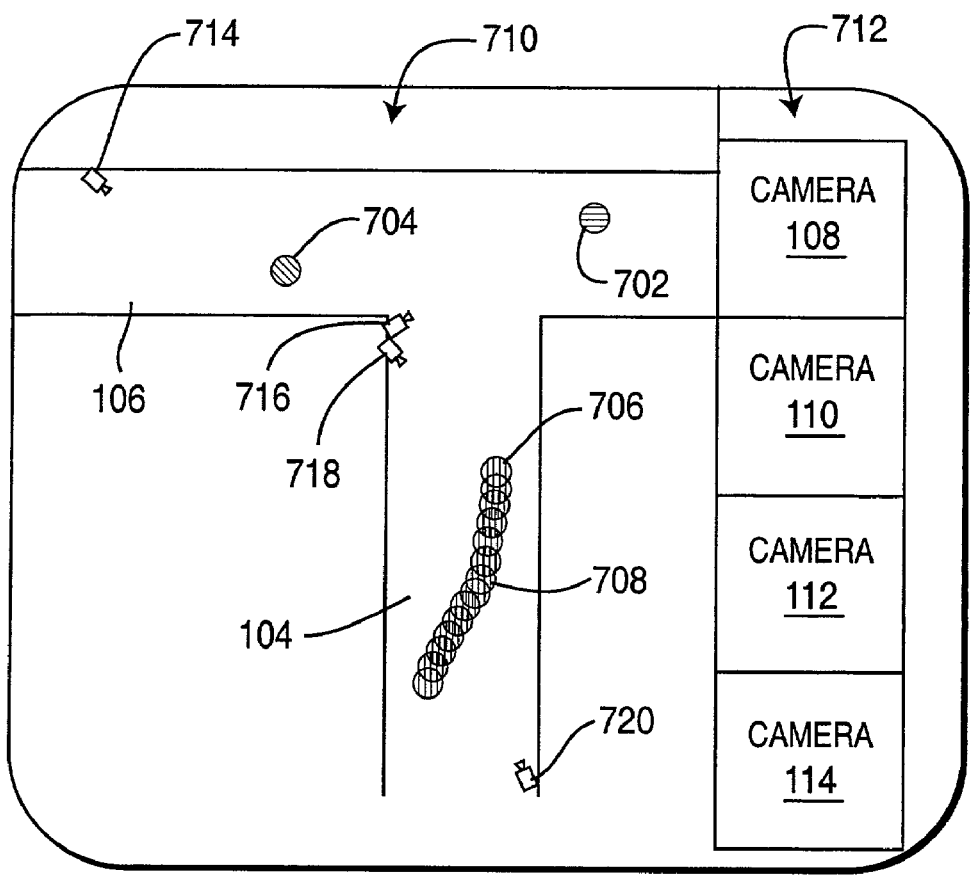
FIG. 7 depicts examples of a display used for modeling moving objects within the hallway structure of FIG. 6.

FIG. 7 depicts an illustrative display screen that may be viewed by a security guard. The view screen 700 depicts a "birds eye" view of the monitored scene in region 710 and depicts, in region 712 four of the live camera views from each of the four cameras 108, 110, 112 and 114. Within region 710 is a rendering of the hallway structure 100 of FIG. 1 containing the moving objects that were identified by the moving object detection process 401 and rendered as icons by the moving object icon generator 501. The icons are 702, 704 and 706 are generally shown as different color "dots" depending on the camera that is capturing the movement of the object. For example, icon 702 may be shown in red and the icon 716 for the camera (camera 110) that is capturing that movement would also be shown in red. Similarly, camera icon 714 may be shown in blue and object 704 would also be in blue. To enhance the identity and movement of the object, the trailing shadow 708 may be used to show prior positions of the moving object as it moves through the scene. Object icon 706 contains shadow trail 708 to show movement of the object along hallway 104. As such, the security guard may receive additional information from erratic or abnormal movement of an object through a scene. Upon identifying an object that the security guard desires to view more closely the security guard may place the mouse pointer upon the object and click or double click to select that object. After selection, the surveillance system generates a view of that object from either a particular camera location or a synthetic camera location that is rendered from the multiple cameras viewing a scene.

Figure 8:
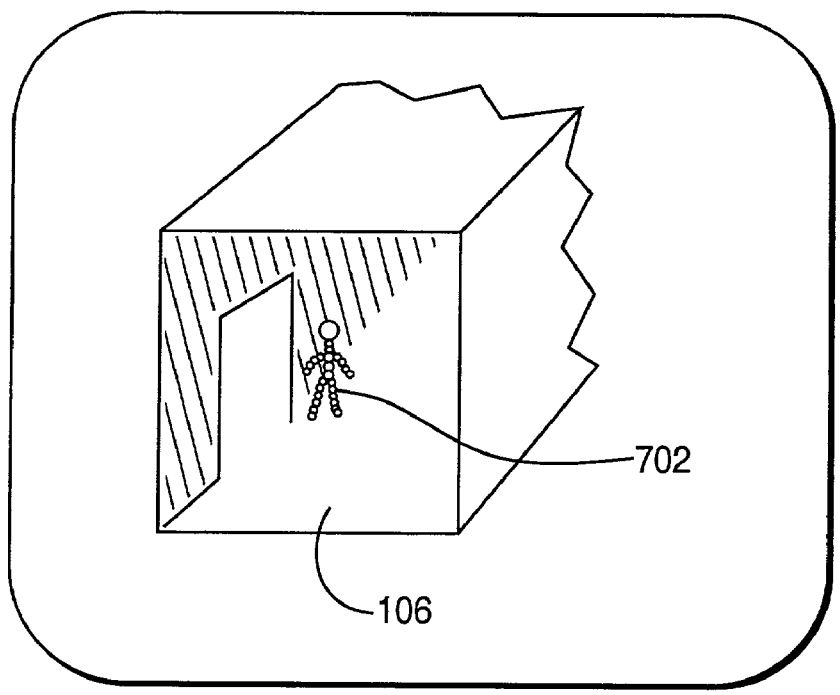
FIG. 8 depicts a display of a synthetic view of a moving object identified by the present invention.

FIG. 8 depicts a synthetic view from a location in hallway 106 of object 702. This synthetic view can be manipulated using a zoom control to zoom in/out on the object, or use a joy stick to move within the scene to get a better view of the object and its destination. Additionally, the security guard can always select a live view of the scene as taken from a camera that is currently imaging the object. The rendered view 702 shows a sphere based model of a person walking along the hallway 106. As the camera angle is panned or tilted for the synthetic view generated from a different location, the three dimensional spherical model will render a person walking down the hallway. The walls and floors of the rendered image are textured from the video that is produced by the cameras such that the synthetic view is as accurate as an actual camera view of the scene. The identification of the moving object and then rendering a specific image of a portion of the entire scene with that object within the scene is known as a "flashlight mode" of operation. The process used for rendering flashlight mode imagery is described in U.S. patent application Ser. No. 09/800,550, filed Mar. 7, 2001.

The present system involves substantial flexibility in the view point and video rendering of a scene. For example, the view selector may include specific go to points for the operator to check on a regular basis. The view may contain camera icons so that the security guard may know exactly what views are available from the live feeds. A top view of the motion as depicted in FIG. 7 is available. The security guard may fly through the image imagery to take a virtual walk through of the scene from a remote location and, at any time, full resolution video is available from the feeds of each of the cameras such that the security guard may elect a full resolution view of the imagery in the scene.

Furthermore, the imagery may be annotated when the mouse pointer is pointed to certain locations within a scene to show the location information regarding that scene or object identification. For example, if a person has entered through a secure check point that person's name and ID number may appear on the screen when that person's icon is identified within the scene. As such, the person could be tracked as they moved through a secure area. Alternatively, a person could be observed in a particular location, the user could request identification, and the full resolution video could be sampled by a face recognition system to identify the person. An annotation of the person's identification could then appear on the three dimensional contextual view of the scene. The user could then track the person as they moved through the facility. If the person could not be identified, security personnel could be dispatched to intercept the unidentified person.

Figure 9:
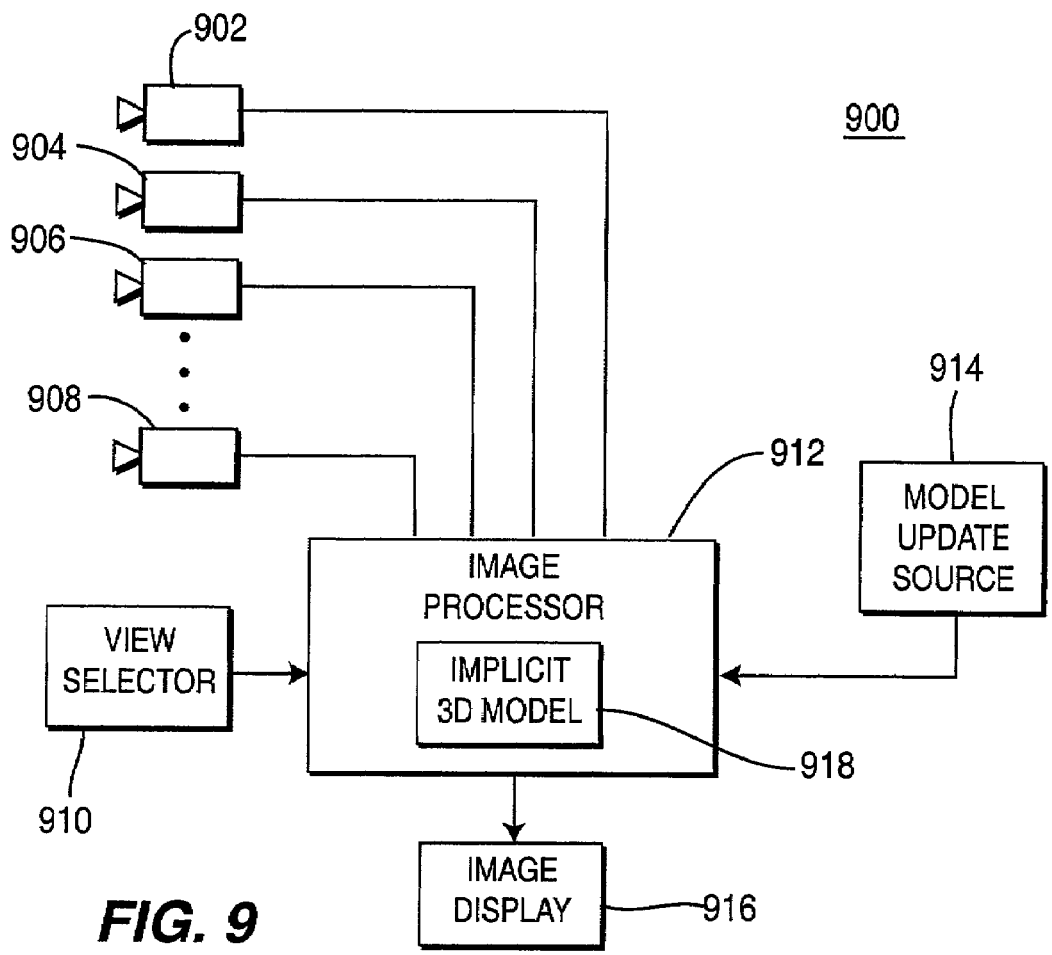
FIG. 9 depicts a block diagram of an alternative embodiment of the invention.

Another embodiment of the present invention is depicted in FIG. 9 where an implicit 3D model is used to provide an intuitive map that interconnects image sequences. The system 900 comprises a plurality of video cameras, or other sources of imagery, 902, 904, 906 and 908 that produce a plurality of video sequences. The video sequences are coupled to an image processor 912 that contains an implicit 3D model 918. The model 918 can be created using the model update source 914. A view selector 910 is coupled to the image processor 912. The view selector 910 is manipulated by a user such that views of the imagery taken by the cameras 902, 904, 906 and 908 are displayed on the image display 916.

The model update source 914 is used to create an implicit 3D model in an apriori manner by a user. In essence, the implicit 3D model creates a map that interconnects the views of the various cameras such that, as an object moves through a scene that is imaged by the cameras, a simple selection of a view using a mouse pointer on the screen will automatically display the best view of the selected image area.

The map (the implicit model) identifies interconnections between video sequences. In one embodiment, the map is a look-up table that comprises, for each video sequence, a transition region and a video sequence associated with the transition region. The transition region may be a single pixel or a region of pixels. Each video sequence is given a unique identification number. The unique identification numbers may be associated with one or more transition regions. Once the relationship is made, the user may select a transition region in a displayed video sequence and the video sequence associated with the region will be displayed.

In one example, each sequence has a transition region at 0, 90, 180 and 270 degrees with the coordinate system of an image. These regions are located at the top, bottom, right and left edges of an image. Other locations may be used. Using the four locations, a user can select a transition region into which an object moves such that a more appropriate view of the object is displayed.

If the cameras are in fixed locations, the implicit map only needs to be created once. To produce the map, the user needs to have knowledge of only the overlaps of the video produced by the cameras then the map can be created having the user identify which cameras overlap with each other camera or closely overlap each other. Note that there does not need to be an explicit overlap between the images. The user need only identify which camera view is desired to be shown next if a target happens to be moving in a particular direction. For each camera that overlaps or nearly overlaps, a user draws a rectangle or other shaped region of interest in the image and keys in which camera should be displayed if an object is moving in a particular direction within that region.

FIG. 11D shows an example scene having three cameras 1104, 1106 and 1108. The coordinate system for each image is shown at scale 1150. Each camera covers a particular region 1114, 1112 and 1110 that is imaged by each of the cameras. Table 1 identifies the implicit three dimensional model (map) for the camera arrangement in FIG. 11D.

TABLE 1

| Camera 1 | Camera 2 | Camera 3 |
|---|---|---|
| 2, 270° | 1, 90° | 2, 0° |
|  | 3, 0° | 2, 180° |
|  | 3, 180° |  |

In the first column, camera 1 has only one available transition to camera 2 when an object moves in the region at 270 degrees. Camera 2 transitions to camera 1 at 90 degrees, camera 3 at 0 degrees and camera 3 also 180 degrees and, lastly, camera 3 transitions to camera 2 at 0 degrees and again at camera 2 at 180 degrees.

FIGS. 11A, 11B and 11C depict the three views from cameras 1104, 1106 and 1108 as an object follows path 1102 shown in FIG. 11D. The object begins at position 1116 and transitions from right to left in FIG. 11A in the view of camera 1104. When the object reaches the left hand side into region 1118, the cursor 1120 may be placed on the object or in the region 1118 to select a new view. At that point, the transitions as defined in table 1 will identify camera 2 at the 270 degree region as the next camera to use to best view the object. FIG. 11B shows the object moving in the view of camera 2 from left to the 0 degree region 1128. As the object moves into region 1128, cursor 1120 may be placed upon the region and selected, the table is then used again to identify the next view of the scene to best image the moving object. The third camera 1108 is now selected as the object begins at position 1130 and moves to position 1132. The object then moves from position 1130 to position 1132. The object then transitions out of the scene. In this manner an implicit 3D model can easily be created to enable a user to quickly follow a moving object through the scene through any number of cameras that have been used to establish the implicit 3 dimensional model.

Figure 10:
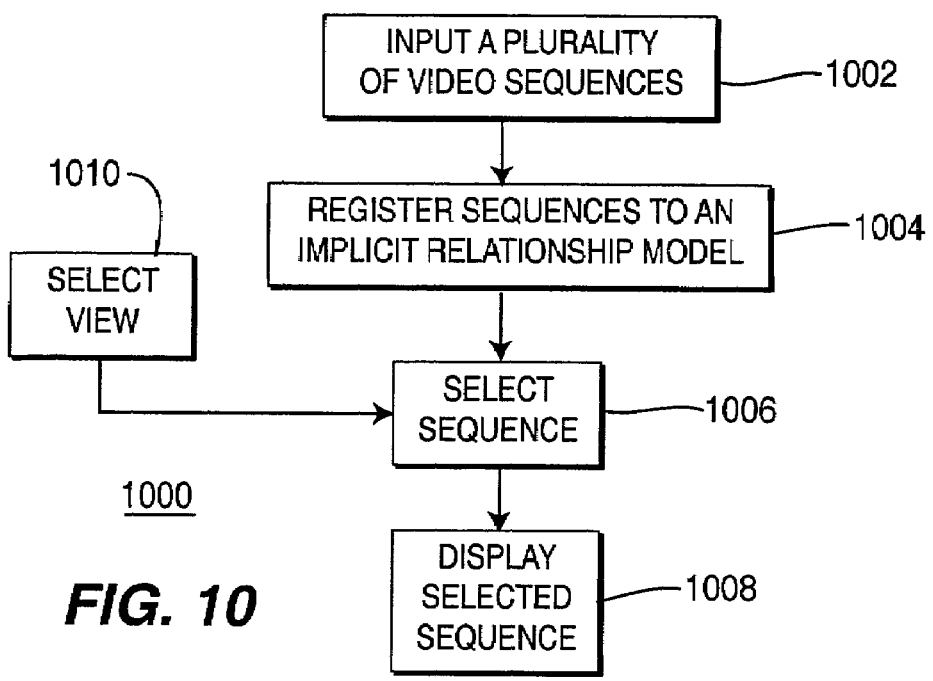
FIG. 10 depicts a flow diagram of a method of the embodiment of FIG. 9.

FIG. 10 is a method of the alternative embodiment of the invention. The method 1000 begins at step 1002 with an input of a plurality of video sequences from the cameras. At step 1004, the video sequences are registered to an implicit relationship model as defined by the user selecting regions to identify cameras to which to transition. At step 1010, a view of the scene is selected using an input device such as a mouse, track pad, track ball and the like. At step 1006, a sequence is selected for display as identified in step 1010, based on the placement of the cursor as discussed above. The selected video sequence is then displayed at step 1008. This system provides and intuitive and simple manner for a user to follow an object through a scene. An operator can easily navigate around the scene by placing the cursor in a transition region within a particular video frame and selecting that region. If the operator wishes to see around a building corner, the operator can select the region of the corner and the best view around the corner would be displayed.

In the foregoing embodiments of the invention, the view selector was described as being manipulated by a user to select a view of the scene. However, the view selector may be automated. For example, when motion is detected in the scene (or a particular type of motion is detected), the view selector may automatically select a view that best displays the region of the scene containing the motion. Those skilled in the art will understand that many other criteria can be used to automate view selection.

While foregoing is directed to the preferred embodiment of the present invention, other and further embodiments of the invention may be devised without departing from the basic scope thereof, and the scope thereof is determined by the claims that follow.

The invention claimed is:

1. A surveillance system for monitoring a scene comprising:
   a three-dimensional model of the scene defining surfaces corresponding to surfaces of real objects in the scene;
   a plurality of cameras each producing a respective video capturing at least a respective portion of the scene;
   an image processor, coupled to said plurality of cameras, constructing a texture map from image data of one or more of the videos and projecting said texture map onto one or more of the surfaces of the model of the scene and rendering a sequence of images representing a view of the scene with the texture map of the image data on said one or more surfaces therein;
   a display, coupled to the image processor, displaying the image to a user; and
   a view controller, coupled to the image processor, for selecting views of the scene to be displayed; and
   wherein the constructing of the texture map includes identifying, for each of said one or more surfaces or portions thereof, a subset of the videos that contain said surface or said portion of said surface; and
   wherein said subset of videos does not include any of the videos that has a view of said surface or portion thereof that is occluded by any of the other surfaces of the model.

2. The surveillance system of claim 1 wherein said image processor further comprises:
   means for identifying moving objects in each of the videos;
   means for producing an icon representing each of the identified moving objects; and
   means for inserting the icon into the combination.

3. The surveillance system of claim 2 further comprising:
   means for identifying a person as a moving object; and
   means for annotating the display with a description of the person.

4. The system of claim 1, wherein, where at least two of the video images contain the portion, the texture map is derived from the video images based on the video image of said subset of video images that is selected as having a most frontal view of the surface or portion thereof.

5. A method of providing surveillance of a scene comprising:
   producing a plurality of videos of the scene;
   producing a three dimensional model of the scene, said model defining surfaces corresponding to surfaces of real objects in the scene;
   selecting a viewpoint for the three dimensional model;
   aligning the plurality of videos with the three dimensional model;
   rendering said plurality of videos onto the three dimensional model to form a combination view comprising a sequence of output images in which the videos are draped onto the three dimensional model, wherein texture maps on at least some of the surfaces of the three dimensional model are generated from the videos;
   each of said videos having a resolution relative to each of the surfaces that said video contains, and each of the texture maps for the surfaces being generated by selecting from a subset of the videos each containing the surface the video having the resolution for said surface that is the highest of said resolutions of the videos of the subset; and
   displaying the combination view.

6. The method of claim 5 wherein the selected viewpoint is a bird's eye view.

7. The method of claim 5 further comprising:
   selecting a location within the combination view; and
   producing a view of the scene from the selected location.

8. The method of claim 5 further comprising:
   identifying moving objects in the videos;
   producing an icon representing each moving object; and
   inserting the icon into the combination view.

9. The method of claim 8 wherein said identifying step further comprises:
   identifying the object as a person; and
   annotating the combination view with text representing the identification of the person.

10. The method of claim 5 further comprising: storing the combination view for replay.

11. The method of claim 5, wherein the texture maps on the surfaces in the three dimensional model are derived by separating the surface into one or more portions of a predetermined size, and for each of the portions detecting a subset of video images that contain the portion and discarding those video images that are occluded from the portion by another surface of the model.

12. A system providing surveillance for a site, said system comprising:
   a computer accessible memory storing data defining a computer-supported three-dimensional model of the site defining one or more surfaces that can be used to produce at least one computer-generated view of the site;
   a plurality of cameras each having a respective actual view of a respective portion of the site under surveillance, each camera forming a respective video of said actual view, said video comprising electronic signals corresponding to a series of frame images captured by the camera;
   a computerized image processing system forming a synthetic image of the site as seen from a viewpoint; and
   a display device providing a display of said synthetic image so as to be viewed by a user;
   said display of the synthetic image comprising a contextual view of the site wherein at least a first portion of the contextual view is derived from the video from one of the cameras by aligning the video with the model of the site, and wherein texture maps on one or more surfaces of the model of the site are generated from said video, the texture maps on each surface that is contained in a subset of more than one of the videos of said subset of videos being derived from the video containing said surface that is selected as having the highest resolution of said surface, said surfaces corresponding to surfaces of real objects in the site.

13. The system of claim 12, wherein the video in said display of said synthetic image is aligned with the model and displayed in real time in the contextual view, so that the user can use the system for real-time surveillance of the site.

14. The system of claim 13, wherein, in another portion of the contextual view that contains no video from the cameras, the image processor renders the view of the model from the viewpoint in said first portion by mapping a texture mopped onto the model.

15. The system of claim 13, wherein the video in the first portion is merged into said contextual view by texturing said surface or surfaces with said video and rendering the view of the textured model.

16. The system of claim 15, wherein aligned video from one or more of the cameras is textured onto said surfaces and viewed in the synthetic image.

17. The system of claim 13, wherein the system further comprises a viewpoint selector input device providing the user with a capability of changing the viewpoint for which the synthetic image is generated.

18. The system of claim 12, wherein the texture maps on the surfaces in the three dimensional model are derived by separating the surface into one or more portions of a predetermined size, and for each of the portions detecting a subset of video images that contain the portion and discarding those video images that are occluded from the portion by another surface of the model.

19. A method of providing surveillance of a real-world site, said method comprising:
provided a plurality of cameras each transmitting a respective video signal corresponding to a respective real-time view of a respective portion of the site, each video signal comprising signals defining a series of frames of said real-time view, each frame corresponding to said view during a respective time period;
receiving said video signals at a computerized image processing system having access to a computer accessible model of the real-world site under surveillance;
said computer accessible model being a three-dimensional model of the site and including data defining a plurality of surfaces of the model corresponding to surfaces of real objects of the real-world site;
rendering with the image processing system a real time surveillance display comprising a series of images each comprising a synthetic view of the model of the site from a viewpoint;
said synthetic view being derived from the model and one or more frames of the video signals selected such that the surveillance display output is a real-time display of the video signals used in the synthetic views;
said frames of the video signals being used to generate texture maps of one or more of the surfaces of the three-dimensional model in said rendering, the texture map for each of said surfaces in the model being derived by selecting the video image that, of a subset of the video images each containing the surface, has the highest resolution of the surface; and
displaying the surveillance display on a display device so as to be viewable by a user.

20. The method of claim 19, and further comprising:
receiving a viewpoint selection input from the user indicative of a desired change in the viewpoint; and
said image processor, responsive to said input, generating said surveillance display images as synthetic views of the model from a second viewpoint.

21. The method of claim 19, wherein the texture maps on the surfaces in the three dimensional model are derived by separating the surface into one or more portions of a predetermined size, and for each of the portions detecting a subset of video images that contain the portion and discarding those video images that are occluded from the portion by another surface of the model.

22. A method of providing surveillance of a scene, said method comprising:
creating a three-dimensional model of static parts of the scene, said model including a plurality of surfaces corresponding to surfaces of said static parts of the scene;
providing video cameras each transmitting respective video data comprising a series of video images each capturing appearance of a portion of the scene at respective time instants;
constructing one or more texture maps for the surfaces of the model so as to create a textured model, said texture maps being created by identifying, for one or more portions of the surfaces, a subset of the video images that each contain said portion and that are not occluded by another surface of the model, and projecting one or more color values for the portion of the surface from a pixel or pixels of one of the video images of said subset of video images, wherein said one of said video images has the highest resolution of the surface of said subset of videos; and
creating an output image sequence based on the textured model by rendering the textured model so as to form an image thereof as seen from a user-selected virtual viewpoint;
wherein the texture maps of the textured model are updated continuously using the incoming video data from the cameras so that the model contains the most currently available video data.

23. The method of claim 22, wherein the model is a polyhedral three-dimensional model and the surfaces are polygonal surfaces.

24. The method of claim 23, wherein said polygonal surfaces are separated into one or more approximately equally sized portions of a predetermined size.

25. The method of claim 22, wherein said rendering is with a graphics pipeline processor or processors.

26. The method of claim 22, wherein said video images of the subset are all from the same time instant.

27. The method of claim 22, wherein the selected virtual viewpoint is controlled manually by a user.

28. The method of claim 22, wherein the selected virtual viewpoint follows a predetermined pattern.

29. The method of claim 22, wherein Z buffering is used to detect the video images that contain said portion and that are not occluded by another surface of the model.

30. The method of claim 22, wherein the sequence of output images is displayed on a viewing screen.

31. The method of claim 22, wherein the video images are aligned in near real-time to the three-dimensional model.

32. A surveillance system for monitoring a scene comprising:
a plurality of cameras producing respective videos each capturing a respective portion of the scene being monitored;
a computer system supporting a polyhedral three-dimensional model of the scene having polygonal surfaces defining static objects of the scene corresponding to surfaces of real objects in the scene being monitored;
said computer system creating texture maps from incoming video data of the videos and projecting the texture maps onto some of the polygonal surfaces so that the model is a textured model, said texture maps being created by identifying, for one or more portions of a predetermined size of the polygonal surfaces, a subset of the video images that contain said portion and that are not occluded by any other surface of the polyhedral model, and determining one or more color values for the texture map on said portion from a pixel or pixels of one of the video images of said subset, wherein said one of the video images has the highest resolution or most frontal view of said portion of said subset of video images;

said computer system rendering the textured model so as to create an output image sequence of output images of the textured model of the scene as seen from a user-selected virtual viewpoint; and an image display displaying the output images to a user;

the texture maps of the textured model being updated continuously using the incoming video data from the cameras so that the model contains the most currently available video data.

33. The system of claim 32, wherein the graphics hardware includes graphics pipeline processors.

34. The system of claim 32, wherein the computer system derives the texture map by selecting a polygonal surface of the model, dividing said selected surface into portions of said predetermined size, selecting one of the portions, detecting all incoming video images containing said portion and discarding any occluded images so as to obtain said subset of the video images, selecting the video image of said subset that has the highest resolution or most frontal view of the portion of the surface, and projecting a color value of the portion from the pixels in said highest resolution or most frontal view video image that corresponds to the portion.

35. The system of claim 32, wherein the output images are stored in digital memory so as to be rewound and replayed.

36. The system of claim 32, wherein at least one of said plurality of cameras is a PTZ camera that has pan, tilt and zoom (PTZ) capability, and wherein creating texture maps generated from said PTZ camera further includes capturing the orientation of the PTZ camera, determining the pose of the camera within the scene, and using said pose to align said video produced from said PTZ camera with the model.

37. The system of claim 32, wherein said computer system identifies moving objects in the videos, produces an icon representing each moving object, and inserts the icon into the output images.

38. The system of claim 32, wherein said computer system identifies moving objects in the videos, produces a two-dimensional object silhouette representing each moving object, and inserts the icon into the output images.

39. The system of claim 32, wherein said computer system further automatically selects a subset of the video images from a time instant containing a view of the scene that best displays a region of the scene for viewing a moving object.

40. A surveillance system for monitoring a scene comprising:

a plurality of cameras producing respective videos each capturing a respective portion the scene;

a computer system supporting a polyhedral three-dimensional model of the scene having polygonal surfaces defining static objects of the scene;

said computer system creating texture maps from incoming video data of the videos and projecting the texture maps onto some of the polygonal surfaces so that the model is a textured model, said texture maps being created by identifying, for one or more portions of a predetermined size of the polygonal surfaces, a subset of the video images from one of the time instants that contain said portion and that are not occluded by any other surface of the polyhedral model and determining one or more color values for the texture map on said portion from a pixel or pixels of one of the video images of said subset, wherein said one of the video images has the highest resolution view of said portion of said subset of video images;

said computer system having graphics hardware and rendering the textured model so as to create an output images sequence of output images of the textured model of the scene as seen from a user-selected virtual viewpoint; and a viewing screen displaying the output images to a user;

the texture maps of the textured model being updated continuously using the incoming video data from the cameras so that the model contains the most currently available video data; and wherein the computer system derives the texture map by selecting a polygonal surface of the model, dividing said selected surface into portions of said predetermined size, selecting one of the portions, detecting by Z-buffering all incoming video images containing said portion and discarding any occluded images so as to obtain said subset of the video images, selecting the video image of said subset that has the highest resolution view of the portion of the surface, and projecting a color value of the portion from the pixels in said highest resolution video image that correspond to the portion.

* * * * *